Aug. 12, 1952     I. J. WILSON     2,606,381
AWNING DISPLAY RACK
Filed Oct. 27, 1950
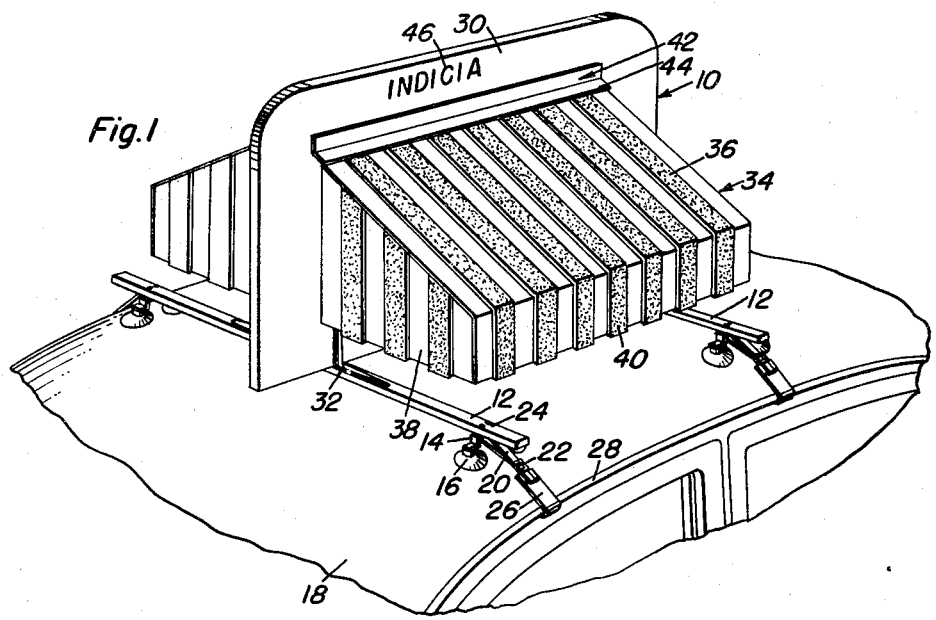
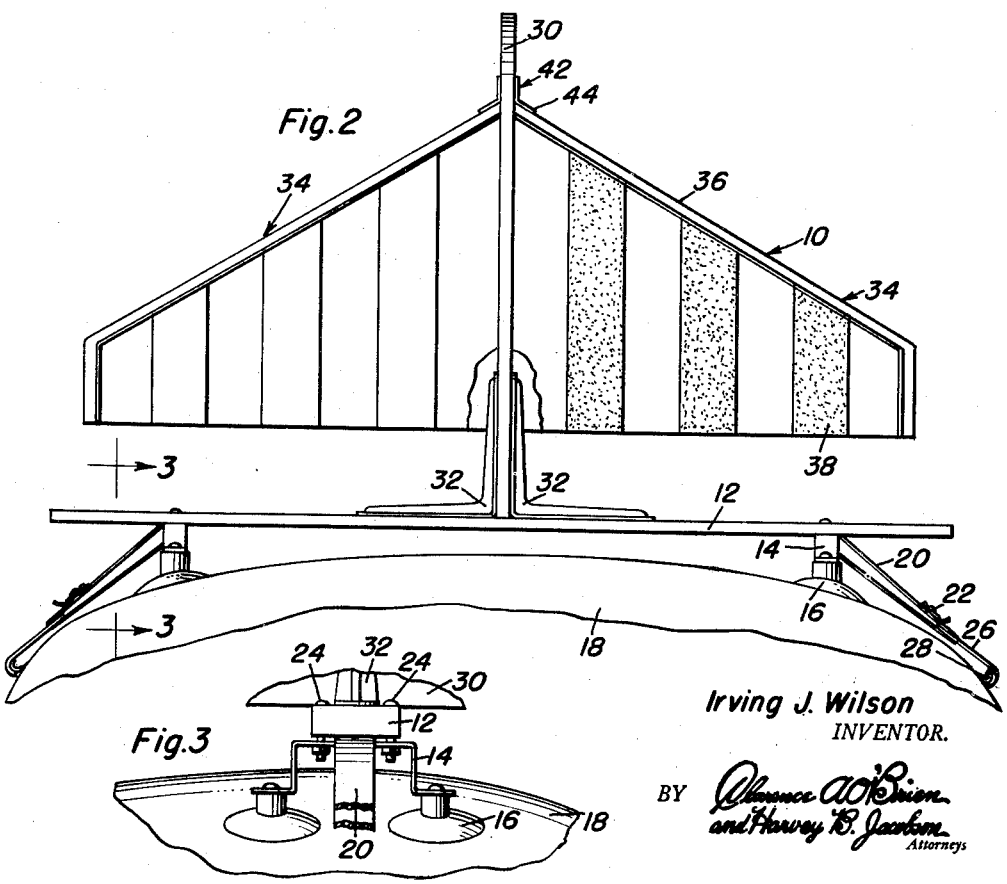
Irving J. Wilson
INVENTOR.

Patented Aug. 12, 1952

2,606,381

UNITED STATES PATENT OFFICE 2,606,381

AWNING DISPLAY RACK

Irving J. Wilson, Albany, Ga.

Application October 27, 1950, Serial No. 192,445

1 Claim. (Cl. 40—126)

This invention comprises novel and useful improvements in advertising devices, and more particularly pertains to an awning display rack for mounting on top of vehicles.

An important object of this invention is to provide a display rack for rigid awnings, in which the awnings may be mounted on the top of a vehicle roof, so as to display them in an improved manner, and to give prospective customers an appreciation of the durability of the awnings, and the wind pressure that the awnings can withstand.

Another important object of this invention is to provide an awning display rack in which an awning is mounted on the roof of a vehicle in such a manner that the awning overlies the roof, and in which the awning, when so mounted, resembles the appearance of the awning when mounted on the side of a home; which display rack is of strong and efficient construction.

These, together with various ancillary objects and features of merit are attained by this device, a preferred embodiment of which has been illustrated, by way of example only, in the accompanying drawings, wherein:

Figure 1 is a perspective elevational view of the awning display rack, shown mounted upon the roof of a vehicle;

Figure 2 is an end elevational view of the awning display rack;

Figure 3 is a fragmentary end elevational view of one of the display rack mounting members.

Reference is now made more specifically to the accompanying drawings wherein like numerals designate similar parts throughout the various views, and in which the awning display rack is denoted generally by the numeral 10.

The display rack includes a pair of supporting members 12 which have the U-shaped bracket 14 secured thereto, adjacent opposite ends thereof, which brackets carry suction cups 16, which are adapted to engage the roof 18 of a vehicle. Straps 20, having a buckle 22 thereon are disposed about the web portion of the U-shaped bracket 14 below the supporting members 12, the straps 20 being interposed between the fasteners 24 which secure the supporting members 12 to the U-shaped members 14. The straps 20 also extend through the apertured attaching hooks 26 which are adapted to engage the drain cap 28 of the vehicle.

An indicia bearing plate 30 is mounted upon the supporting members 12, by suitable L-shaped brace members 32, the plate 30 being disposed perpendicular to the supporting members 12, and extending parallel to the longitudinal axis of the vehicle.

A rigid awning 34 which includes a roof section 36, side sections 38 and a front wall 40, is secured to each side of the plate 30, in the same manner in which the awning 34 is conventionally mounted upon the side of a house. A suitable cap strip 42 may be secured to the opposite sides of the plate 30, which cap strip has one leg 44 thereof overlying the roof section 36 of the awning 34. As it will be appreciated from a consideration of Figures 1 and 2, the awnings 34 are symmetrically disposed upon opposite sides of the indicia bearing plate 30, the lower edge of the awning being disposed in vertical spaced relation to the support members 12, the awning being supported solely in the manner in which they are customarily attached to the side of a house. As the specific construction of the awning, and the manner of mounting the same to the side of a house, forms no part of this invention further discussion is deemed unnecessary.

As it will be appreciated from a consideration of Figure 1, the roof section and side section of the awning 34 are preferably spaced inwardly respectively from the top and side edges of the indicia bearing plate 30 so as to provide a space for advertising indicia such as 46.

It is believed apparent that the mounting of an awning on the roof of a vehicle, in such a manner that additional braces or fasteners, other than those customarily utilized for mounting the awning on a house, are not necessitated, will impress upon the prospective customers of the durability of the awning, and the ability thereof to withstand high wind velocity, such as would be encountered by the awning, when mounted upon a rapidly moving vehicle. This is a prerequisite for a satisfactory awning, and it will be accordingly appreciated that a display rack which mounts an awning on a vehicle is particularly adapted to promote the sales thereof.

From the foregoing, it is thought that the operation and construction of the device will be readily understood, and further discussion is believed to be unnecessary. However, since numerous modifications will readily occur to those skilled in the art after a consideration of the foregoing specification and accompanying drawing, it is not intended to limit the invention to that shown and described, but all suitable modifications may be resorted to, falling within the scope of the appended claim.

Having described the invention, what is claimed as new is:

A display comprising a pair of spaced parallel horizontal support members, a vertical indicia bearing plate extending transversely of and resting on said support members, three dimensional awning displays disposed on opposite sides of said plate, said plate extending outwardly and above said awning displays, the portions of said plate above said awning displays being adapted to be provided with indicia forming signs on opposite sides of said plate.

IRVING J. WILSON.

REFERENCES CITED

The following references are of record in the file of this patent:

UNITED STATES PATENTS

| Number | Name | Date |
|---|---|---|
| 549,630 | Cole | Nov. 12, 1895 |
| 1,885,282 | O'Connor | Nov. 1, 1932 |
| 1,942,444 | O'Connor | Jan. 9, 1934 |
| 2,077,585 | Rivers | Apr. 20, 1937 |